Figure 1:
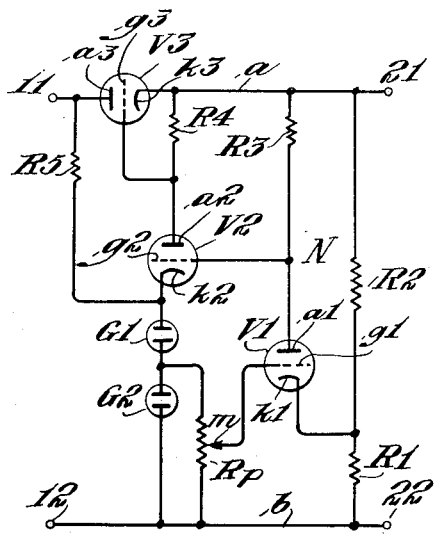

June 5, 1951     B. J. COSMAN     2,555,680

POWER SUPPLY REGULATION

Filed Feb. 21, 1946

Inventor
Bernard J. Cosman
by Roberts, Cushman & Grover
Att'ys.

Patented June 5, 1951

2,555,680

UNITED STATES PATENT OFFICE 2,555,680

POWER SUPPLY REGULATION

Bernard J. Cosman, Arlington, Mass., assignor to Harvey Radio Laboratories, Inc., Cambridge, Mass., a corporation of Massachusetts Application February 21, 1946, Serial No. 649,360

10 Claims. (Cl. 323—22)

The present invention relates to power supply regulation and more particularly to a voltage regulation system employing electron discharge devices.

Apparatus for furnishing a supply of regulated electric power to a load is usually designed to minimize, within a minimum of time, changes in output voltage when the input voltage of the regulating system changes or when the output current drawn therefrom varies. Operation of optimum effectiveness is obtained when the effective output resistance of the regulated power supply system is exactly zero, so that changes in output current can not possibly affect the output voltage. The customarily used electronically regulated power supplies have, however, a positive source resistance which varies from a few to several hundred ohms. It is very difficult to obtain by conventional methods source resistances which are considerably below five ohms, which, for many practical purposes, renders such regulated supply systems insufficient.

It is an object of the present invention to provide a power supply regulation system which provides, with very simple means and a minimum of standard circuit elements, reliable and widely adaptable output regulation which is effectively equivalent to a circuit having very low, and if desired even negative, supply output resistance.

Other objects are to provide a power supply regulation system which furnishes an output voltage that increases to a controllable and stable degree when current is drawn from the system; to provide such a system which imparts exactly zero source impedance to any conventionally regulated power supply irrespective of its voltage or current ratings; to provide means which impart zero source impedance to power supplies which are designed to regulate output voltages over a range of several thousand volts; to provide a power supply regulation system having effectively zero source impedance while delivering high output currents with the aid of a single current regulator tube, avoiding the conventional use of several such tubes connected in parallel in order to pass the total output current; and to provide a device of this type which allows, by means of a single knob control, variation of the power supply output resistance from a few ohms positive, as for example characteristic of the conventional regulated supply operating without the device according to the invention, through zero to any amount of negative resistance up to several thousand ohms.

In one of its aspects, the voltage regulation system according to the present invention determines the current carrying characteristics of a conventional variable conductivity device such as an electron discharge tube, by means of a network of the type of an amplification factor bridge which includes an auxiliary load element supplying a potential difference whose value is adjustable but remains constant regardless of variations of the voltage supplied to this network; in another aspect, the system according to the invention applies voltage variations of an input terminal by means of the above-mentioned variable potential drop load element, to the variable conductivity device; in a further aspect, the input voltage variation is applied to the variable conductivity device through the intermediary of an amplification stage which permits utilization of the adjustability of the above-mentioned voltage drop.

In still another aspect, the invention contemplates control of the current carrying characteristics of a variable conductivity device in one of two transmission lines having two input and two output terminals, by means of a network which furnishes a voltage drop of substantially constant but adjustable value, this network including two resistors which are connected in series between the two lines, and an electron discharge tube whose anode is connected to the first conductor, whose control electrode is connected to a source of adjustably constant voltage, and whose cathode is connected to a point between the two resistors, the resistors being so selected that the amplification factor of the tube is substantially equal to the ratio of the resistance value of the resistor next to the first conductor to that of the other resistor, and the network being associated with provisions for applying changes in the conductivity of the tube in terms of controlling voltage to the variable conductivity device.

In yet another aspect the voltage control arrangement according to the invention is characterized by means for adjusting the conductivity of the above-mentioned tube proportionate to a potential supplied by the source of adjustably constant voltage as well as to the output current of the system, the tube being, however, unable to distinguish between the respective effects of constant source potential and variable current.

An additional feature of arrangement according to the invention is the possibility of handling heavy output currents by means of a resistor shunting the regulator tube, the positive resistance introduced by the shunt being rendered harmless by a negative resistance supplied by the regulation control according to the invention.

These and other objects, aspects and features will appear from the following description of several typical practical embodiments illustrating the novel characteristics of my invention. This description refers to a drawing whose three figures are circuit diagrams of three different embodiments of the invention.

Fig. 1 shows an electronic regulator circuit incorporating the invention, this arrangement being able to provide an output voltage variable between 1000 and 3600 volts, and providing a minimum change in output voltage due to changes in output current and input line voltage. In this figure, $a$ and $b$ are two D. C. transmission lines with input terminals 11, 12 and output terminals 21, 22. Across wires $a$ and $b$ is connected a network N of the general type of an amplification-factor bridge. This network consists of series resistors R1, R2, a high vacuum tube V1 with anode $a1$, cathode $k1$ and control electrode $g1$, a transfer resistor R3 in the anode connection of tube V1, and a constant voltage supply for grid $g1$. Although this is not essential so long as strict proportionality of the variables of the systems is not required, the bridge tube V1 will in most instances be a tube with fairly constant amplification factor, such as a sharp cutoff pentode; at any rate, this tube should have a large amplification factor A which is substantially equal to the ratio of the resistance values of resistors R2 and R1. The above-mentioned constant voltage supply may consist of glow tubes G1 and G2 and a potentiometer Rp also referred to as control resistor with tap $m$ leading to grid G1. Cathode $k1$ of tube V1 is connected to a point between resistors R1 and R2. The glow tubes G1 and G2 are in the cathode connection of an amplifying or linking vacuum tube V2, with anode $a2$, control electrode $g2$, and cathode $k2$. The grid $g2$ is connected to the lead between anode $a1$ and transfer resistor R3, and anode $a2$ is connected to line $a$ through a linking resistor R4.

A third, current regulating vacuum tube V3 is connected with its anode $a3$ to terminal 11 and with its cathode $k3$ to terminal 21, whereas its control electrode $g3$ is joined to a point between anode $a2$ and regulating resistor R4. A resistor R4 completes the constant voltage supply circuit with tubes G1 and G2.

This circuit arrangement operates as follows:

In an amplification factor bridge, such as in the present instance represented by resistors R1, R2, R3 and tube V1, the voltage drop across R3 is constant for any given grid bias, irrespective of changes in voltage across R1 and R2, that is, changes in output voltage, provided that the amplification factor A is comparatively large and $r_2 = Ar_1$ where $r_1$ and $r_2$ are the resistances of R1 and R2. The potential of $k2$ being fixed by the glow tubes and the voltage drop across R3 being by definition constant for constant potential of $g1$ (likewise fixed by the glow tubes), any change in output voltage (that is, change in the potential level of line $a$ as compared to that of $b$ which latter is referred to $k2$ by the constant voltage circuit), is referred or transferred directly, that is, without contribution of tube V1 (beyond the determination of the constant value of the current in and drop across R3) to the grid $g2$ of tube V2. For example, if the potential level of $a$ drops ten volt, the potential of grid $g2$ likewise drops ten volt, whereas the potential difference between $a$ and $g1$ depends upon the setting of $m$ which controls the constant potential of grid $g1$ of tube V1 and hence the correspondingly constant value of the current in R3. The variation of the grid bias of tube V2 correspondingly varies the plate current through resistor R4 and the voltage drop across that resistor which in turn determines the bias of tube V3. A decrease of the output voltage between lines $a$ and $b$ increases the voltage drop across resistor R4 and renders tube V3 more conductive and an increase of output voltage correspondingly makes V3 less conductive. Thus, changes in output voltage are minimized due to the counterchange in the conductance of regulating tube V3.

The output voltage of the circuit according to Fig. 1 can be controlled by means of the control resistor potentiometer Rp which permits change of the bias of tube V1 by shifting tap $m$, selecting corresponding operating points for V1. Provided that the amplification factor A is fairly constant over the range of the bias control by means of tap $m$, the bridge retains the above-described properties regardless of the output voltage. The bridge balance being independent of the output voltage over very wide limits, the degree of regulator action is left independent of the output voltage.

Reduction of the bias of tube V1 by manipulating tap $m$ increases the plate current of tube V1, thereby increasing the drop across resistor R3 which, however, remains constant for this particular bias of V1. The increase of the bias of V2, due to the increased drop across R3, results in decreasing the bias of V3, and the increased conductance of V3 reduces the voltage drop across V3 and the output voltage rises to a new equilibrium value determined by the setting of $m$.

Summing up, it will now be evident that, due to the constant potential of the cathode of V2 and the constant voltage drop across R3, changes in output voltage are directly applied to the grid of V2, which in turn applies the output voltage change to tube V3 which minimizes that change; setting of the bias of V1 permits adjustment of the regulator action, which adjustment is the main purpose of tube V1 and the amplification factor bridge circuit. Once the output voltage has been fixed by setting tap $m$, conventional regulator action takes place, the output voltage dropping by some finite amount when the output is loaded.

Figure 2:
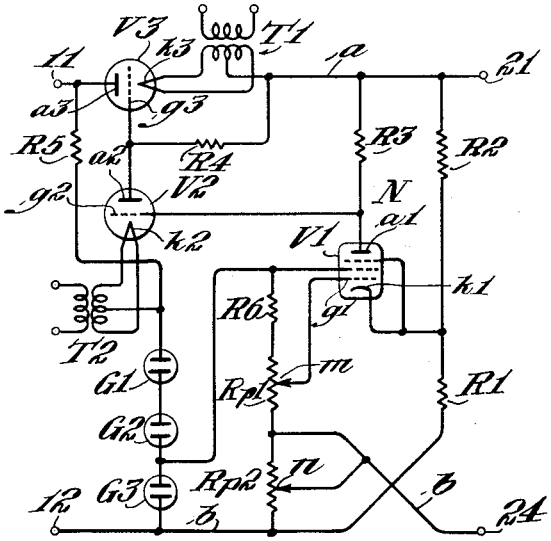

Instead of regulating the output voltage by minimizing its drop to a predetermined value when the output is loaded, the present circuit can also be used to produce stable and controllable over-regulation by means of a modification of the above-described circuit which is shown in Fig. 2, this modification being referred to as regulation control, as distinguished from the above-described output voltage control by means of tap $m$.

As indicated by corresponding identification marks, the circuit according to Fig. 2 is in the main similar to that shown in Fig. 1, with the exception that output terminal 24 is connected to input terminal 12 through a series or current responsive potentiometer Rp2, also referred to as compensating resistor, by means of a tap $n$ which permits adjustment of the resistance value of resistor Rp2.

Fig. 2 also indicates all the auxiliary elements of a practical circuit as used in an actual embodiment, the components of this embodiment having the following values:

Input voltage between terminals 11 and 12 ............ 4200 volts
Output voltage between terminals 21 and 24 ............ 1000 to 3800 volts
Supply voltages of heater transformers T2 and T3 ............ 110 volts
Tube V1 ............ Type 6SJ7
Tubes V2 and V3 ............ Type 800
Tubes G1 and G2 ............ Type VR 150
Tube G3 ............ Type VR 75
Resistor R1 ............ 1,000 ohm, 1 watt
Resistor R2 ............ 500,000 ohm, 15 watt
Resistor R3 ............ 1.8 megohm, 20 watt
Resistor R4 ............ 15,000 ohm, 20 watt
Resistor R5 ............ 600,000 ohm, 50 watt
Resistor R6 ............ 500,000 ohm, 1 watt
Resistor $Rp1$ ............ 15,000 ohm
Resistor $Rp2$ ............ 50 ohm The effect of rheostat device $Rp2$ with adjustable tap $n$ is the following one:

When low current is drawn from the supply system, the voltage on terminals 21, 24 is determined by the setting of output voltage control tap $m$ of parallel control resistor $Rp1$ as explained with reference to Fig. 1. When current is drawn from terminals 21, 24, the voltage drop in resistor $Rp2$ is opposite to that in resistor $Rp1$, decreasing the grid bias of tube V1 by an amount which depends upon the resistance setting of tap $n$ and upon the value of the output current. A decrease in the bias of V1 affects tubes V2 and V3 in the manner explained above, eventually causing an increase in the conductance of tube V3, thereby increasing the output voltage to a new value determined by the new bias of tube V1.

It will thus be evident that potentiometer $Rp2$ with regulation control tap $n$ acts as an automatic means for changing the bias of tube V1 to produce an increase of the output voltage when current is drawn from the supply system. This regulation, which depends upon the value of the output current, does not prevent the circuit from regulating in the above-described manner against line voltage changes while under load, due to the fact that tube V1 can not distinguish between the controlling potential levels of taps $m$ and $n$, respectively, since the respective variable voltages are applied in series to grid $g1$. Therefore, $Rp2$ provides any desired degree of regulation against changes in output current while the regulation against line input voltage changes (adjustable by means of tap $m$ of $Rp1$) stabilizes the output voltage at whatever new value effected by the setting of tap $n$ of $Rp2$.

By making the value of $Rp1$ large as compared to $Rp2$ (as indicated in the above-tabulated data), the bias change at tube V1 can be made very much greater than the change in output voltage and thus considerable over-regulation effected. The effective resistance of $Rp2$ appearing in series with the output of the power supply, it might seem that positive resistance has thus been added to the supply output impedance; upon closer inspection it will, however, be noted that the resistance of $Rp2$ affects the bias of tube V1 to such an extent that the effective output resistance is made negative by an amount which is several times that of $Rp2$.

The above-described apparatus according to Fig. 2 was, for example, dimensioned to provide a regulated no-load output of 1,000 volts. With $Rp2$ at zero, the circuit provides conventional voltage regulation, a rated load causing a very small but still perceptible drop in the output voltage. With $Rp2$ set at various values up to 50 ohms, the output voltage under load rises from the no-load voltage of approximately 1,000 volts to loaded output voltages as high as 3,800 volts, with an unregulated direct current input voltage of 4,200 volts. This indicates clearly that the control effected by $Rp2$ introduces an output resistance as high as 100,000 ohms negative, while only 50 ohms positive have been added to the output. Under these operating conditions the same circuit also completely regulates against line voltage variations, even for the above extreme over-regulation setting of $Rp2$, due to the above-mentioned independence of the conventional regulating action upon the regulating effects of the bias setting of tube V1.

Circuits incorporating the regulation control feature described above with reference to Fig. 2 are particularly advantageous for use in power supply devices expected to deliver a fixed output voltage for specific applications demanding such service. In conventional supply devices for that purpose, the resistance of the regulating circuit depends upon the amount of direct current amplification in the control tube circuits. However, this amplification is often insufficient especially if the regulated output has a comparatively high voltage (such as several thousand volts), when transmitting type tubes, usually triodes must be used, whose gain is often too low for good regulation. If regulation control according to Fig. 2 is used, the output resistance can always be adjusted to exactly zero, regardless of output voltage or current, this being due to the fact that this control merely adds negative resistance enough to cancel out whatever positive resistance may exist.

If a power supply system is required to furnish a fixed output voltage and a heavy output current, the above-described circuits may be used with a comparatively small current tube V3, if modified according to Fig. 3 which will now be described.

Figure 3:
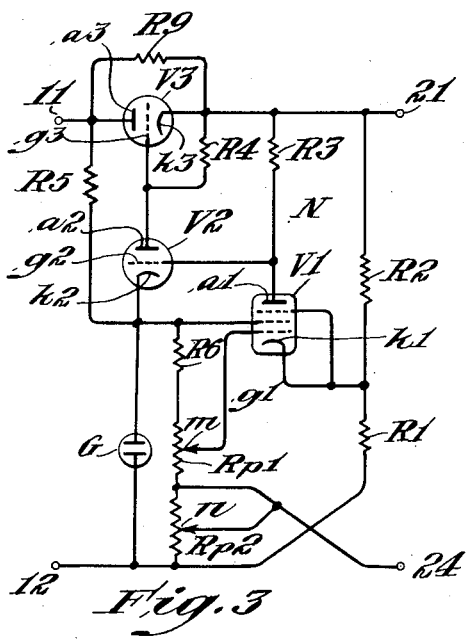

The circuit according to Fig. 3 is essentially that of Fig. 2, but with a resistor R9 added, which bridges tube V3.

In circuits of this type, the load current is divided between the regulator tube V3 and the resistor R9. The shunt R9 contributes added positive resistance to the supply output impedance, which has to be cancelled out by the negative resistance introduced by the regulation control $Rp2$. Thus, the power supply circuit can have zero output impedance while, nevertheless, tube V3 passes only a part of the output current.

Devices according to Fig. 3 thus eliminate the need for the undesirable paralleling of current tubes in the place of V3, for the purpose of regulating a given total current. This, apart from the elimination of several elements with their appurtenant auxiliary devices, reduces tendencies toward parasitic oscillation and unequal current division among the tubes.

It should be understood that the present disclosure is for the purpose of illustration only and that this invention includes all modifications and equivalents which fall within the scope of the appended claims.

I claim:

1. A voltage regulation system comprising two transmission conductors; regulating means inserted in one of said conductors and having variable conductance depending upon a regulating voltage applied thereto; a network connected to said conductors which network includes a source of adjustable control voltage and resistance means connected to one of said conductors, and said network being adapted to establish in said resistance means a current which retains a substantially constant value substantially independent of voltage variations between said conductors but dependent upon said adjustable control voltage; detecting resistor means in one of said conductors; means for applying the voltage drop in said resistor means, due to current variation in its conductor, to said network such as to cause variation of said adjustable control voltage and hence of said current and the resulting drop in said resistance means; and means for applying said variation of said drop in said resistance means and said voltage variations between said conductors, through the intermediary of the voltage drop due to said current in said resistance means, as said regulating voltage to said regulating means thereby adjustably varying its conductance in conformity with said voltage variations between said conductors and said current variation in said conductor.

2. A voltage regulation system comprising two transmission conductors; regulating means inserted in one of said conductors and having a variable conductance depending upon a regulating voltage applied thereto; shunt resistance means bridging said regulating means; a network connected to said conductors which network includes a source of adjustable control voltage and resistance means connected to one of said conductors, and said network being adapted to establish in said resistance means a current which retains a substantially constant value substantially independently of voltage variations between said conductors but adjustably dependent upon said control voltage; detecting resistor means in one of said conductors; means for applying the voltage drop in said resistor means, due to current variation in its conductor, to said network such as to cause variation of said adjustable control voltage and hence of said current and the resulting drop in said resistance means; and means for adjustably applying said variation of said drop in said resistance means and said voltage variations between said conductors, through the intermediary of the voltage drop due to said current in said resistance means, as said regulating voltage to said regulating means thereby adjustably varying its conductance in conformity with said voltage variations between said conductors and said current variation in said conductor, and compensating the effect of said shunt resistance means.

3. A voltage regulation system comprising a transmission line having two conductors with two input terminals and two output terminals; in one of said conductors current control means whose conductance is adapted to be varied by a controlling voltage applied thereto; an amplification factor bridge including a voltage source which is adjustable to a substantially constant value, two resistors connected in series between said conductors, an electron discharge device having an anode connected to said first conductor, a control electrode connected to said source and a cathode connected to a point between said two resistors, and resistance means in said anode connection, the amplification factor of said discharge device being substantially equal to the ratio of the resistance values of the resistor next to said first conductor and the other resistor; and means for applying potential variations between said conductors in series with the substantially constant voltage drop in said resistance means in terms of controlling voltage to said current control means, adjustment of said voltage source permitting variation of said controlling voltage and hence of the conductance of said current control means.

4. A voltage regulation system comprising a transmission line having two conductors with two input terminals and two output terminals; a first electron discharge device having an anode and a cathode connected in series in one of said conductors, and a control electrode; means for dividing the voltage between said output terminals; a second electron discharge device having a cathode connected to a tap of said dividing means, a control grid, and an anode connected through a transfer resistor to said first conductor, the amplification factor of said second discharge device being substantially equal to the ratio of the voltage drops of the portions of said voltage dividing means between said tap and said first conductor and said second conductor, respectively; means for applying a substantially constant voltage to said control grid; means for adjusting said voltage; a third electron discharge device having an anode connected through a linking resistor to said first conductor, a control electrode connected to said anode of said second discharge device and a cathode; means for supplying said cathode of said third discharge device with substantially constant potential; and a connection from the control electrode of said first device to said anode of said third device.

5. A voltage regulation system comprising a transmission line having two conductors with two input terminals and two output terminals; current control means in one of said conductors whose conductance is adapted to be varied by a controlling voltage applied thereto; a source adapted to supply substantially constant voltages; output resistance means connected between said terminals of one of said conductors; an amplification factor bridge including two resistors connected in series between said first conductor and the input terminal of said second conductor, an electron discharge device having an anode connected to said first conductor, a control electrode connected to receive a substantially constant voltage from said source, and a cathode connected to a point between said two resistors, and resistance means in said anode connection, the amplification factor of said discharge device being substantially equal to the ratio of the resistance values of the resistor next to said first conductor and the other resistor; means for applying potential variations between said conductors in series with the substantially constant voltage drop in said resistance means in terms of controlling voltage to said current control means; and means for adjusting said constant voltage supplied to said control electrode by said source proportionate to the voltage drop in said output resistance means.

6. A voltage regulation system comprising a transmission line having two conductors with two input terminals and two output terminals; in one of said conductors a regulating tube whose conductance can be varied by a controlling voltage applied to its control electrode; an amplification factor bridge including a voltage source which is adjustable to a substantially constant value, two resistors connected in series between said conductors, a bridge tube having an anode connected to said first conductor, a control electrode connected to said source and a cathode connected to a point between said two resistors, and resistance means in said anode connection, the amplification factor of said bridge tube being substantially equal to the ratio of the resistance values of the resistor next to said first conductor and the other resistor; and means for applying potential variations between said conductors in series with the substantially constant voltage drop in said resistance means in terms of controlling voltage to said current control means, adjustment of said voltage source permitting variation of the effect of said regulating tube.

7. A voltage regulation system comprising a transmission line having two conductors with two input terminals and two output terminals; a regulating tube having an anode and a cathode connected in series in one of said conductors, and a control electrode; means for dividing the voltage between said output terminals; a bridge tube having a cathode connected to a tap of said dividing means, a control electrode, and an anode connected through a transfer resistor to said first conductor, the amplification factor of said bridge tube being substantially equal to the ratio of the resistances of the portions of said voltage dividing means between said tap and said first conductor and said second conductor, respectively; a constant voltage tube system connected between said conductors and including potentiometer means for applying a substantially constant but adjustable voltage to said second control electrode; a linking discharge tube having an anode connected through a linking resistor to said first conductor, a control electrode connected to said anode of said bridge tube and a cathode supplied with substantially constant potential from said constant voltage system; and a connection from the control electrode of said regulating tube to said anode of said linking tube.

8. A voltage regulation system comprising a transmission line having two conductors each with an input terminal and an output terminal; a regulating tube having an anode and a cathode connected in series in one of said conductors and a control electrode; a source adapted to supply a substantially constant voltage; adjustable output resistance means connected in series between said terminals of the second one of said conductors; potentiometer means connected between a terminal of said source and the output terminal end of said output resistance means; an amplification factor bridge including two resistors connected in series between said first conductor and the input terminal of said second conductor, a bridge tube having an anode connected to said first conductor, a control grid connected to receive a substantially constant voltage from said potentiometer means, and a cathode connected to a point between said two resistors, and resistance means in said anode connection, the amplification factor of said discharge device being substantially equal to the ratio of the resistance values of the resistor next to said first conductor and the other resistor; a linking tube having a grid which is connected to said resistance means for applying potential variations between said conductors in series with the substantially constant voltage drop in said resistance means, in terms of controlling voltage, to said control electrode of said regulating tube; and means for adjusting said constant voltage supplied by said source proportionate to the voltage drop in said output resistance means.

9. A voltage regulation system comprising two transmission conductors with input terminals and output terminals; regulating means connected to said conductors and having variable conductance for varying the output voltage of said conductors depending upon a regulating voltage applied thereto; a network including a control resistor connected across the conductors and having a tap for adjusting said regulating voltage, and a compensating resistor connected in series in one of said conductors between the input terminal of the conductor and the point of connection thereto of said control resistor, the voltage drop in said compensating resistor opposing the adjustable voltage drop in said control resistor thereby applying current variations in said conductor as adjustably modified by said voltage drop in said control resistor, as said regulating voltage to said regulating means.

10. A voltage regulation system comprising two transmission conductors with input terminals and output terminals; a vacuum tube having a control electrode and being connected to said conductors for varying through its variable conductance the output voltage of the conductors depending upon a regulating voltage applied to the control electrode; a control network including a compensating resistor connected in series with one of said conductors and an adjustable control resistor connected in series with said compensating resistor between said input terminals and having an intermediate point connected to the tube control electrode thereby to impress on said electrode a voltage which is a function of the sum of the voltage drop in the resistors; whereby current variations in said conductor effective as voltage drop in said compensating resistor, as modified by adjusted voltage drop in said control resistor are applied as said regulating voltage to said tube.

BERNARD J. COSMAN.

REFERENCES CITED

The following references are of record in the file of this patent:

UNITED STATES PATENTS

| Number | Name | Date |
| --- | --- | --- |
| 2,318,644 | Tubbs | May 11, 1943 |
| 2,362,769 | Parratt et al. | Nov. 14, 1944 |
| 2,414,242 | Potter | Jan. 14, 1947 |
| 2,443,541 | Neustadt | June 15, 1948 |